(12) United States Patent
West

(10) Patent No.: US 7,646,275 B2
(45) Date of Patent: Jan. 12, 2010

(54) DEVICE AND METHOD FOR ELIMINATING TRANSFORMER EXCITATION LOSSES

(75) Inventor: Rick West, Pismo Beach, CA (US)

(73) Assignee: Xantrex Technology, Inc., Livermore, CA (US)

( * ) Notice: Subject to any disclaimer, the term of this patent is extended or adjusted under 35 U.S.C. 154(b) by 478 days.

(21) Appl. No.: 10/250,145

(22) Filed: Jun. 6, 2003

(65) Prior Publication Data

US 2004/0246085 A1 Dec. 9, 2004

(51) Int. Cl.
*H01F 30/12* (2006.01)

(52) U.S. Cl. .......................................................... 336/5

(58) Field of Classification Search ..................... 336/5, 336/170, 180–184; 307/12–13; 363/152–153
See application file for complete search history.

(56) References Cited

U.S. PATENT DOCUMENTS

| | | | | |
|---|---|---|---|---|
| 3,614,461 A * | 10/1971 | Speer et al. | .................. | 307/64 |
| 3,967,180 A * | 6/1976 | Weber et al. | ................ | 320/128 |
| 4,190,800 A * | 2/1980 | Kelly, Jr. et al. | ....... | 340/310.12 |
| 4,281,515 A * | 8/1981 | Ferriera | ...................... | 62/235.1 |
| 4,565,929 A * | 1/1986 | Baskin et al. | ................ | 290/44 |
| 4,626,763 A * | 12/1986 | Edwards | ...................... | 318/811 |
| 4,685,022 A * | 8/1987 | Nichols et al. | ................ | 361/44 |
| 5,539,601 A * | 7/1996 | Farag | .......................... | 361/23 |
| 6,434,024 B2 * | 8/2002 | Shirato | .................... | 363/21.07 |
| 7,511,979 B2 * | 3/2009 | Newman, Jr. | ............... | 363/149 |

* cited by examiner

*Primary Examiner*—Tuyen Nguyen
(74) *Attorney, Agent, or Firm*—Nixon Peabody LLP

(57) ABSTRACT

The invention is a device and method for eliminating core excitation losses in a distribution transformer when the transformer is not supplying power to loads. The invention consists of sensors, a control circuit, a user interface and a power contactor. The power contactor is connected on the line side of a transformer and is opened or closed automatically based on preprogrammed time or load criteria determined by the control circuit. In one operational mode and when the transformer is disconnected from the line, the control board generates low power pulses at the transformer load connection points in order to "search" for loads. If a load is detected, the transformer is reconnected by way of contactor closure. If the transformer load drops to zero, for a predetermined amount of time, the transformer is again disconnected and the pulsed load search is reestablished.

12 Claims, 2 Drawing Sheets

DEVICE AND METHOD FOR ELIMINATING TRANSFORMER EXCITATION LOSSES

BACKGROUND OF INVENTION

The field of this invention is electric power distribution and control. Excitation losses are a function of the voltage applied to the primary windings of a transformer and are not load dependant. These no-load losses typically account for 50% of the total transformer losses at rated conditions. The magnitude of the excitation loss is proportional to the size of the transformer and is typically 1% to 2% of the power rating in larger transformers. The Environmental Protection Agency has determined that 61 billion kWH of electricity is wasted each year in transformer losses. The invention is intended to disconnect a distribution transformer from the AC power source during no-load conditions. The invention is targeted for use in industrial and renewable energy applications.

DETAILED DESCRIPTION

Figure 1:
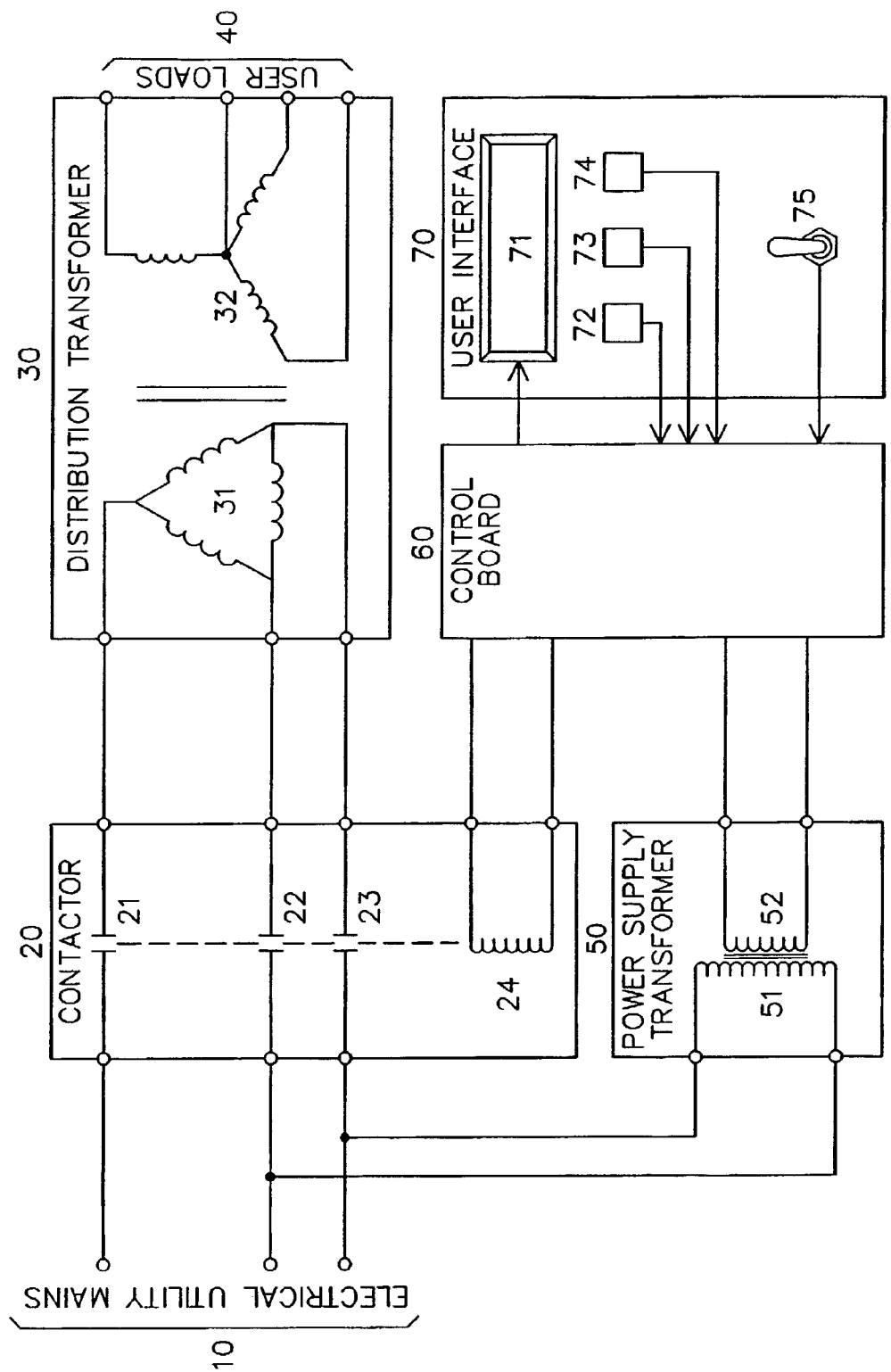
FIG. 1 Preferred embodiment of the invention operating with preprogrammed on and off times where load are not sensed or detected.
Figure 2:
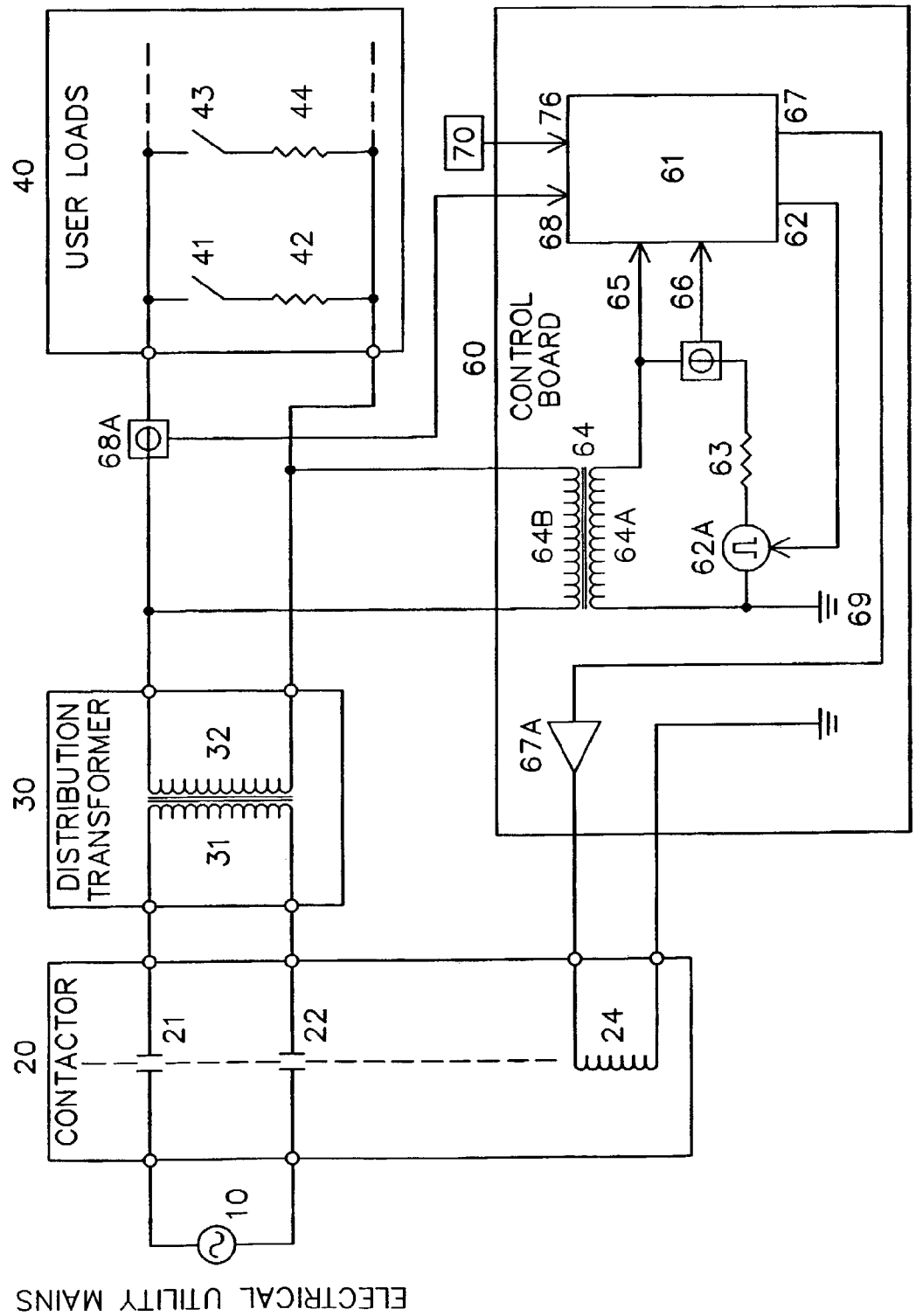
FIG. 2 Preferred embodiment of the invention operating with load current monitoring when the transformer is connected to the utility line and operating with a smart load search algorithm when the transformer is disconnected from the utility line.

FIG. 1 illustrates a simplified preferred embodiment of the invention as used with external three-phase distribution transformer 30, powered by electric utility mains 10 and delivering power to user loads 40. The invention substantially consists of contactor 20, power supply transformer 50, control board 60 and user interface 70. The contactor consists of electrical contacts 21, 22 and 23 that are closed or opened as the contactor control coil 24 is energized or de-energized respectively. Contactor 20 is positioned to make or break the electric utility power connection to the primary side of transformer 30 as commanded by control board 60. User interface 70 allows the user to program the operational mode as well as connect, disconnect and reconnect criteria of through programming switches 72, 73 and 74 and display panel 71. Switch 75 is a bypass switch that overrides control board 60 commands and forces the connection of the transformer to electric utility mains 10. There are number of intended operational modes for the invention. In the user selected timed sleep mode, the user enters the expected times of transformer use at the user interface by time of day and day of week and thereby programs a controller microchip on the control board. A typical industrial application would be to disconnect all distribution transformers used for machinery, process control and factory lighting after the last work shift of the day and on weekends. In the user selected photovoltaic mode, the user enters time, date, longitude and latitude at the user interface. The program within a control board controller microchip calculates the times of sunset and sunrise and commands the contactor to be open during these time periods. In the user selected wind turbine mode, an external sensor, typically an anemometer or turbine tachometer, measures wind speed. The program within a control board controller microchip commands the contactor to be open during times or low wind speed. The delay to disconnect and delay to reconnect parameters are selectable at the user interface. FIG. 2 illustrates the preferred embodiment of the invention with the added capability of operating in a smart load detection mode as shown with external single-phase distribution transformer 30, powered by electric utility mains 10 and delivering power to user loads 40. In system applications with three-phase transformers, three of the circuits described herein would be used. For the purpose of illustrating the smart load detection function, all of the invention is not shown in FIG. 2. As illustrated in FIG. 2 and when the invention is operating in the user selected, smart load detection mode and when contactor 20 is closed and distribution transformer 30 is energized and supporting user loads 40, the controller microchip 61 monitors current sensor 68A through analog to digital converter input 68 on controller microchip 61. This data is compared to a zero current, null value stored in nonvolatile memory and is used to determine a no-load condition on transformer secondary 32. If a no-load condition is detected continuously for the user-programmed period of time, contactor 20 is opened. In FIG. 2, loads 42 and 44 with switches 41 and 43 represent a plurality of typical loads. To detect the reconnection of any load when transformer 30 is not energized, the controller microchip 61 sends a command 62 to pulse generator 62A. The resulting pulse is applied across divider impedance 63 and the primary 64A of isolation transformer 64. The impedance of the any loads connected to transformer secondary 32, will be reflected by through isolation transformer secondary 64B to primary 64A. The voltage sensed across isolation transformer primary 64A and the current sensed through the same winding are connected to analog to digital inputs on controller microchip 61. Controller microchip 61 in the preferred embodiment is a digital signal processor (DSP) device. Controller 61 analyses the response to the pulse compared to a baseline no-load response. If controller 61 determines from this real-time to prerecorded data comparison that a load is connected or has been reconnected to transformer secondary 32, then command 67 is given to coil driver 67A to close contactor 20 thereby energizing transformer 30 to support user loads 40. Load detection and reconnection can be accomplished in a less than 1 second. The load seeking pulse rate can be many times per second with the only criteria being that the total pulse energy be orders of magnitude less than excitation losses that the invention is saving. The recording of baseline, no-load conditions is initiated through user interface 70 via command 76 to controller 61 to generate calibration pulses and store the results as part of the system setup routine. 69 is the reference designator for the control circuit ground. A device configured from the component parts described, the function of the circuits described and the methods of application that may in part or as a whole contribute to the saving of transformer core excitation losses are novel, new and the basis of this invention.

What I claim as my invention is:

1. A circuit for selectively coupling one or more loads to a power supply, the circuit comprising:
   a distribution transformer having a primary winding and a secondary winding, the secondary winding being coupled to at least one of the loads;
   a contactor having a control input and coupled between the power supply and the primary winding of the distribution transformer, the contactor being configured to selectively establish a power connection between the power supply and the primary winding of the transformer based on an input signal provided at the control input; and
   a control circuit configured to issue the input signal as a function of a selected operational mode.

2. The circuit of claim 1, wherein the contactor has a control coil and one or more electrical contacts configured to selectively establish an electrical connection between the power supply and the primary winding of the distribution transformer, the one or more electrical contacts being controllable by the control coil based on the input signal provided at the control input.

3. The circuit of claim 1, wherein the distribution transformer is a three phase distribution transformer.

4. The circuit of claim 1, wherein the selected operational mode is a manually selected bypass.

5. The circuit of claim 1, wherein the selected operational mode is a function of a program of the control circuit.

6. The circuit of claim 5, wherein the program is a timed sleep and wake mode.

7. The circuit of claim 5, wherein the program is a work shift-dependent mode.

8. The circuit of claim 5, wherein the program is a photovoltaic mode which takes account of one or more of time, date, longitude, or latitude.

9. The circuit of claim 5, wherein the program calculates sunset and sunrise times.

10. The circuit of claim 5, wherein the program takes account of wind speed.

11. The circuit of claim 5, wherein the program includes connect delay and/or disconnect delay times.

12. The circuit of claim 1, further comprising a power transformer configured to provide power from the power supply to the control circuit.

* * * * *

UNITED STATES PATENT AND TRADEMARK OFFICE
CERTIFICATE OF CORRECTION

PATENT NO. : 7,646,275 B2  Page 1 of 1
APPLICATION NO. : 10/250145
DATED : January 12, 2010
INVENTOR(S) : Rick West It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 557 days.

Signed and Sealed this

Sixteenth Day of November, 2010

David J. Kappos
*Director of the United States Patent and Trademark Office*